(12) United States Patent
Arrighi

(10) Patent No.: US 11,833,601 B2
(45) Date of Patent: Dec. 5, 2023

(54) BANDSAW WITH A SHAPED BAND BLADE

(71) Applicant: Francesco Arrighi, Lucca (IT)

(72) Inventor: Francesco Arrighi, Lucca (IT)

(*) Notice: Subject to any disclaimer, the term of this patent is extended or adjusted under 35 U.S.C. 154(b) by 0 days.

(21) Appl. No.: 16/345,332

(22) PCT Filed: Oct. 20, 2017

(86) PCT No.: PCT/IT2017/000230
§ 371 (c)(1),
(2) Date: Apr. 26, 2019

(87) PCT Pub. No.: WO2018/078663
PCT Pub. Date: May 3, 2018

(65) Prior Publication Data
US 2019/0247938 A1    Aug. 15, 2019

(30) Foreign Application Priority Data
Oct. 28, 2016   (IT) ........................ 102016000109228

(51) Int. Cl.
| | |
|---|---|
| *B23D 55/00* | (2006.01) |
| *B23D 61/12* | (2006.01) |
| *B26D 1/04* | (2006.01) |
| *B26D 7/12* | (2006.01) |
| *B26D 1/48* | (2006.01) |
| *B26D 1/46* | (2006.01) |
| *B26D 3/16* | (2006.01) |
| *B26D 1/00* | (2006.01) |

(52) U.S. Cl.
CPC ........... *B23D 55/00* (2013.01); *B23D 61/123* (2013.01); *B23D 61/126* (2013.01); *B26D 1/04* (2013.01); *B26D 1/46* (2013.01); *B26D 1/48* (2013.01); *B26D 3/16* (2013.01); *B26D 7/12* (2013.01); *B26D 2001/006* (2013.01); *B26D 2210/11* (2013.01)

(58) Field of Classification Search
CPC ...... B27B 33/06; B23D 61/12; B23D 61/121; B23D 61/123; B23D 61/125; B23D 61/126; B23D 61/127; Y10T 83/9317; Y10T 83/9319; Y10T 83/9348; B26D 2210/11; B26D 1/46
USPC .............. D15/134, 138, 139; D8/64; 30/380
See application file for complete search history.

(56) References Cited

U.S. PATENT DOCUMENTS

| | | | |
|---|---|---|---|
| 54,681 A * | 5/1866 | Buschman | B23D 61/123 83/661 |
| 239,710 A * | 4/1881 | Boynton | B23D 61/123 83/847 |
| 336,407 A | 2/1886 | Hanks et al. | |
| 690,678 A * | 1/1902 | Thomas | B23D 61/123 83/661 |

(Continued)

OTHER PUBLICATIONS

International Search Report, dated Apr. 3, 2018, corresponding to International Application No. PCT/IT2017/000230.

*Primary Examiner* — Evan H MacFarlane
(74) *Attorney, Agent, or Firm* — Maschoff Brennan

(57) ABSTRACT

A bandsaw having a shaped band blade, at least one pair of flywheels (5, 6) arranged to move the shaped band blade; a motor member (7) connected to at least one flywheel of the pair of flywheels; a bench (8) for supporting and feeding at least one object to be cut, wherein the shaped band blade (1) has a band having a variable width between an area (2) of minimum width and an area (3) of maximum width.

2 Claims, 1 Drawing Sheet

(56) References Cited

U.S. PATENT DOCUMENTS

| | | | |
|---|---|---|---|
| 865,348 A | 9/1907 | Allison | |
| 1,711,374 A * | 4/1929 | Chapman | B23D 55/065 83/788 |
| 1,850,478 A * | 3/1932 | Schaefer | B23D 61/123 83/847 |
| 2,795,255 A * | 6/1957 | Hansen | B26D 1/0006 83/661 |
| 3,259,004 A * | 7/1966 | Chisholm | B26F 3/06 83/171 |
| 4,023,448 A * | 5/1977 | Bertini | B23D 61/123 76/112 |
| 4,141,260 A * | 2/1979 | Bertini | B23D 65/00 72/301 |
| 4,160,397 A * | 7/1979 | Bertini | B23D 61/123 125/18 |
| 4,189,968 A * | 2/1980 | Miranti, Jr. | B23D 55/082 83/661 |
| 4,205,571 A | 6/1980 | Bertini | |
| 4,333,370 A * | 6/1982 | Sack | B23D 53/02 83/56 |
| 4,423,653 A * | 1/1984 | Howard | B23D 55/088 83/661 |
| 4,558,614 A * | 12/1985 | Harris | B23D 53/08 83/56 |
| 4,901,612 A * | 2/1990 | Harris | B23D 53/08 83/56 |
| 5,094,135 A * | 3/1992 | Nakahara | B23D 61/021 83/847 |
| D387,071 S * | 12/1997 | Reznik | D15/134 |
| 6,463,836 B1 * | 10/2002 | Snodgrass, Jr. | B23D 55/082 83/13 |
| 6,532,852 B1 * | 3/2003 | Tsujimoto | B23D 61/121 83/661 |
| 2002/0121171 A1 * | 9/2002 | Falberg | B23D 53/12 83/820 |
| 2008/0121079 A1 | 5/2008 | Hashimoto et al. | |
| 2013/0174701 A1 | 7/2013 | Elliston et al. | |
| 2015/0075346 A1 * | 3/2015 | Kullmann | B23D 61/123 83/661 |
| 2016/0114416 A1 * | 4/2016 | Maiolo | B23D 61/123 83/835 |
| 2016/0167143 A1 * | 6/2016 | Ivner | B23D 61/123 83/835 |

\* cited by examiner

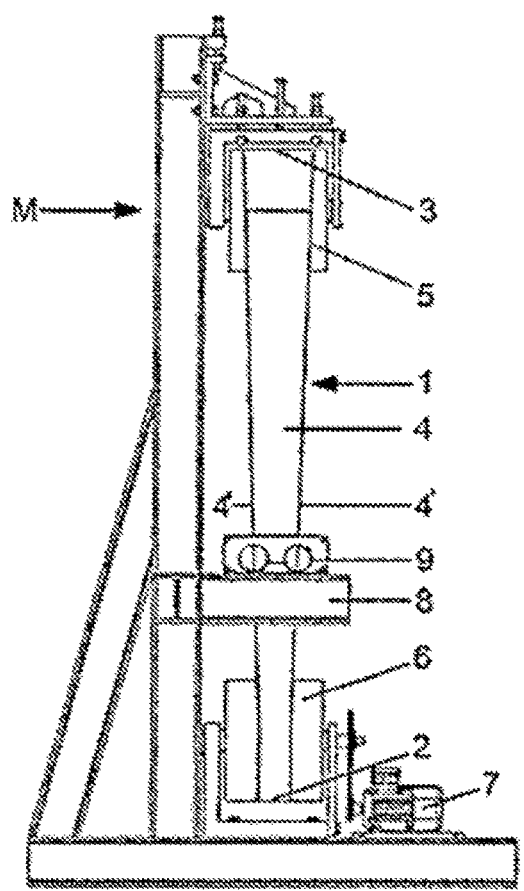
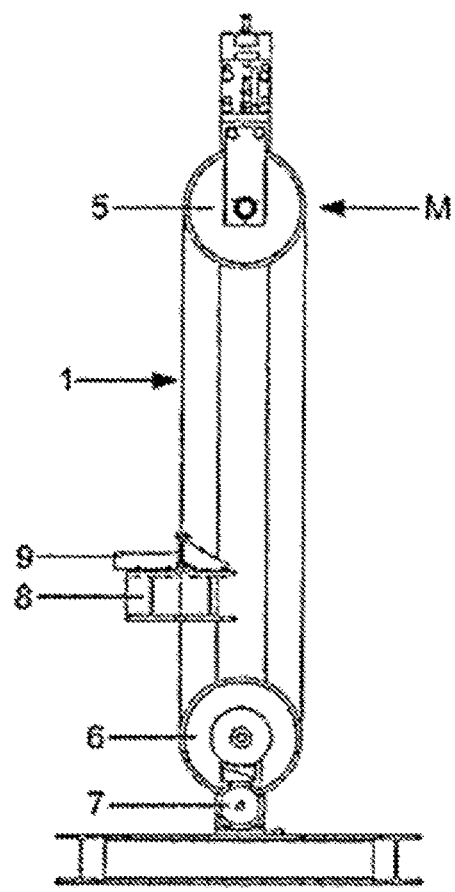
FIG. 1
FIG. 2
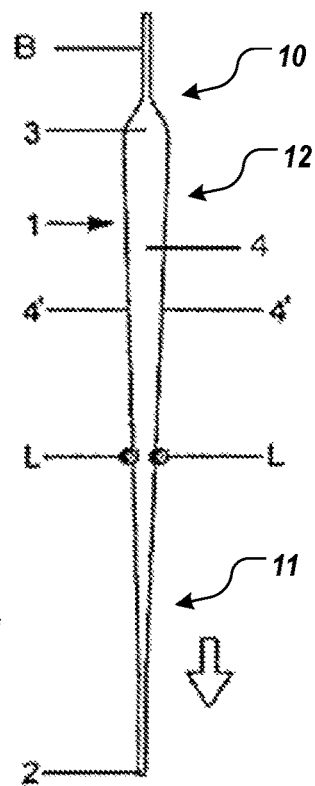
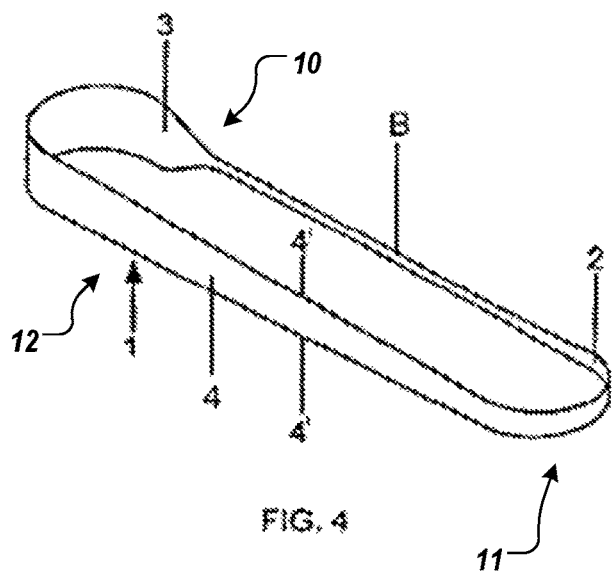
FIG. 3
FIG. 4

BANDSAW WITH A SHAPED BAND BLADE

The invention is aimed at the field of industrial machinery, in particular at converting machinery, facilitating cutting of products arranged in logs, i.e., according to formats having geometric features such that one of the three dimensions is predominant over the others.

In converting, a log is represented by products obtained from the conversion line and not yet cut, with a length of up to 3 meters. More in detail, the invention relates to a bandsaw with a shaped band blade, which, positioned downstream of the converting line, allows the wound or folded product to be cut into commercial formats.

The converting industry deals mainly with the conversion of logs of large size into products destined to be sold to the final consumer (rolls of toilet tissue, kitchen towel, napkins, etc.), obtained by cutting the log into sections of adequately predetermined minimum length.

The cutting operations of the log are commonly carried out by means of industrial bandsaws, also called log saws.

Those with greater cutting precision are provided with a band blade of constant width, with cutting edge orthogonal to the direction of feed of the log, arranged between a pair of flywheels, at least one of which connected to a motor member. The logs are arranged on a bench that normally allows the shifting movements thereof to perform the cut.

Due to the shape of the band blade used, the aforesaid industrial bandsaws must perform out the following movements cyclically:
 stepped movement, adapted to determine feeding of the log and consequent definition of the predetermined cutting length of the log;
 cutting movement, orthogonal to the previous movement, adapted to determine shifting of the log toward the cutting edge of the blade (or vice versa) and consequent dividing of the log into sections of predetermined minimum length;
 return movement, adapted to determine the return of the log to the initial position and consequent performance of a subsequent stepped movement.

These movements, performed in alternation, interspersed by functional stops and decelerations, determine the consequent occurrence of mechanical inertia capable of greatly limiting the cutting speed of the aforesaid industrial bandsaws, and of compromising the overall efficiency of the production lines correlated therewith.

The object of the invention is to overcome the aforesaid limits and negative points of current industrial bandsaws provided with band blade. The object of the invention is achieved with a bandsaw with a shaped band blade comprising:
 a shaped band blade comprising:
 a cutting portion comprising:
 a first end and a second end;
 a cutting edge extending between said first end and said second end;
 a band portion connecting the first end to the second end such that the shaped band blade forms a loop such that, during movement of the shaped band blade in the traveling direction, the band portion and the cutting portion continuously follow each other.
 The bandsaw comprising:
 a pair of flywheels arranged to move the shaped band blade according to the traveling direction;
 a motor connected to at least one flywheel of the pair of flywheels; and
 a bench comprising a cradle, the bench being arranged for supporting a log of material to be cut and for feeding said log of material, wherein,
 said band portion is configured narrower than said cutting portion to permit feeding of the log of material fed by said bench during a passage of the band portion when said shaped band blade is moving in said traveling direction; and
 said cutting portion is configured by said cutting edge arranged as a single sloping linear cutting edge between said first end and second end in such a way that said single sloping linear cutting edge completely cuts the log of material, during a single passage of the cutting portion following the passage of the band portion.

Further features of the invention are described in the dependent claims. The invention produces the following important advantages:
 it allows elimination of the cyclical cutting and return movements normally performed by industrial bandsaws, thereby eliminating the mechanical inertia that limits their cutting speed and consequently the overall productivity;
 it allows a decrease in the number of mutually moving members normally present in current industrial bandsaws, thereby reducing their structural complexity and consequently the overall production and running costs;
 it allows the process to be extended to cut logs of different materials (paper, wood, polymers, metals, etc.) with a single blade of constant and extremely limited thickness, thereby reducing buckling loads and consequently the overall stability relative to current industrial bandsaws;
 it allows the cutting of logs of easily combustible materials (paper, wood, etc.) to be performed with a blade distinguished by a limited thermal inertia;
 it allows balancing of the cutting forces, if this is performed out on at least two logs simultaneously, arranged adjacent to the blade provided with two cutting edges;
 it allows the sharpening unit of the blade to be spaced from the cutting point of the log, thereby reducing the potential risk of combustion of the processing waste (paper dust, wood shavings, etc.) caused by the heat and sparks developed by the sharpening process.

Further features and advantages of the invention will be more evident from the more detailed description set forth below, with the aid of the drawings, which show a preferred implementation thereof, illustrated by way of non-limiting example, wherein:

FIGS. 1-2 show, respectively in a front and side plan view, a bandsaw with a shaped band blade according to the invention;

FIGS. 3-4 show, in an open front plan view and in a perspective view, the structure and the operating principle of a shaped band blade for a bandsaw according to the invention.

With reference to the details of the figures, a bandsaw M according to the invention comprises:
 a shaped band blade 1, consisting of
 a cutting portion 4 shaped to vary linearly from an area 2 of minimum width to an area 3 of maximum width, so as to define at least one linear cutting edge 4', inclined with respect to the cutting direction of the shaped band blade 1, the cutting portion 4 including a first end 10, a second end 11, and a middle portion 12;
 a band portion B, which has a width less than said area of minimum width 2 of said cutting portion 4, and which is arranged to connect said area of minimum width 2 and said area of maximum width 3 of said cutting portion 4 in such a way that said shaped band blade 1 forms a loop;

at least one pair of flywheels 5, 6 for operation of said shaped band blade 1, at least one of the which associated with a motor member 7;

a bench 8 for supporting and feeding logs L to be cut, provided with cradles 9 for housing the logs.

As is apparent in FIGS. 3 and 4, the particular shape of the shaped band blade 1 allows the bandsaw M, forming the subject matter of the invention, to perform the stepped movements of the logs L close to band portion B during the passage of the latter and to make the cut, by means of the inclined linear cutting edge 4' of cutting portion 4, during the subsequent passage of the blade from its area of minimum width 2 to said area of maximum width 3, thereby allowing the advantageous elimination of the cutting and return movements commonly performed by current industrial bandsaws, and the mechanical inertia resulting from these movements.

Said bandsaw M can be advantageously applied in the paper converting sector, and in particular in the cutting of wound logs L, into toilet paper or kitchen towel or similar products, to be sold to the final consumer.

Said bandsaw M can if necessary be adapted to cut logs L of materials of any type (wood, polymer, metals, etc.) modifying its method of variation from the area 2 of minimum width to the area 3 of maximum width of the shaped band blade 1, and the characteristics of the or each inclined linear cutting edge 4' of cutting portion 4 (smooth, serrated, etc.) and of the construction materials (metal alloys, composites, etc.) of the shaped band blade 1. Advantageously the number of flywheels can also be increased.

Operation of one exemplary embodiment of the bandsaw is as follows.

The logs L, at least individually or in pairs, in this latter case advantageously arranged on the right and on the left of the shaped band blade 1 inside the cradles 9, are fed during the passage of the band portion B of the band blade 1 near the bench 8. At the subsequent passage of the cutting portion 4 from its area of minimum width 2 to said area of maximum width 3 with width increasing to the maximum width, by the or each linear cutting edge 4' of cutting portion 4, each single log L is cut without the need for any shifting movement of the log or the blade.

The cutting process can thus take place only with the movement for stepped feed of the log(s) and of rotation of the flywheels that transmit motion to the shaped blade.

The invention claimed is:

1. A bandsaw comprising:
a shaped band blade comprising:
a cutting portion comprising:
a first end and a second end;
a cutting edge extending between said first end and said second end;
a band portion connecting the first end to the second end such that the shaped band blade forms a loop such that, during movement of the shaped band blade in a traveling direction, the band portion and the cutting portion continuously follow each other;
a pair of flywheels arranged to move the shaped band blade according to the traveling direction;
a motor connected to at least one flywheel of the pair of flywheels; and
a bench comprising a cradle, the bench being arranged for supporting a log of material to be cut and for feeding said log of material, wherein,
said band portion is configured narrower than said cutting portion to permit feeding of the log of material fed by said bench during a passage of the band portion when said shaped band blade is moving in said traveling direction; and
said cutting portion is configured by said cutting edge arranged as a sloping linear cutting edge between said first end and said second end; and
said cradle comprising openings defining a feeding direction for said log of material, said openings arranged laterally to said traveling direction in order to be crossed completely by said cutting portion and not to be crossed by said band portion when said shaped band blade travels in said traveling direction in such a way that said log of material can be fed in said feeding direction through said openings during a single passage of said band portion and that said sloping linear cutting edge completely cuts a portion of the log of material that extends beyond in said openings during a single passage of the cutting portion following the passage of the band portion.

2. The bandsaw according to claim 1, wherein:
the log of material comprises a first log of material;
the sloping linear cutting edge comprises a first sloping linear cutting edge portion and the cutting portion further comprises a second sloping linear cutting edge portion that is arranged opposite to the first sloping linear cutting edge portion with respect to the shaped band blade; and
the second sloping linear cutting edge portion is configured to completely cut a second log of material while the first sloping linear cutting edge portion completely cuts the first log of material.

* * * * *